United States Patent
Huang

(10) Patent No.: US 11,800,007 B2
(45) Date of Patent: Oct. 24, 2023

(54) ABNORMALITY MONITORING METHOD AND SYSTEM BASED ON ROAMING SYSTEM

(71) Applicant: YEALINK (XIAMEN) NETWORK TECHNOLOGY CO., LTD., Fujian (CN)

(72) Inventor: Zhangshui Huang, Fujian (CN)

(73) Assignee: YEALINK (XIAMEN) NETWORK TECHNOLOGY CO., LTD., Xiamen (CN)

( * ) Notice: Subject to any disclaimer, the term of this patent is extended or adjusted under 35 U.S.C. 154(b) by 114 days.

(21) Appl. No.: 17/467,260

(22) Filed: Sep. 5, 2021

(65) Prior Publication Data
US 2022/0150350 A1 May 12, 2022

(30) Foreign Application Priority Data
Nov. 9, 2020 (CN) .......................... 202011242571.8

(51) Int. Cl.
*H04M 3/24* (2006.01)
(52) U.S. Cl.
CPC .................................... *H04M 3/24* (2013.01)
(58) Field of Classification Search
None
See application file for complete search history.

(56) References Cited

U.S. PATENT DOCUMENTS

| | | | | |
|---|---|---|---|---|
| 5,625,881 A * | 4/1997 | Sandler | ................ | H04B 7/0604 340/7.25 |
| 5,734,699 A * | 3/1998 | Lu | ........................... | H04W 4/24 455/422.1 |
| 7,760,857 B2 * | 7/2010 | Vetter | ................. | G06F 11/2294 379/9.03 |
| 9,819,792 B2 * | 11/2017 | Zilles | ...................... | H04M 3/242 |
| 2006/0132301 A1 * | 6/2006 | Stilp | ....................... | G08B 25/10 340/539.22 |
| 2012/0150632 A1 * | 6/2012 | Fan | ........................ | G06Q 30/016 705/14.49 |
| 2015/0071416 A1 * | 3/2015 | Gottlieb | .............. | H04M 3/2209 379/22.03 |
| 2015/0350933 A1 * | 12/2015 | Mannemala | ........... | H04W 24/04 370/225 |
| 2018/0041378 A1 * | 2/2018 | Yan | ........................ | H04W 24/04 |

* cited by examiner

*Primary Examiner* — Quoc D Tran

(57) ABSTRACT

An abnormality monitoring system based on a roaming system, including a monitoring host, a mobile device terminal, and a roaming device group, where the roaming device group includes a cluster service host and several roaming hosts; and any one of the roaming hosts is configured to: receive real-time data uploaded by the mobile device terminal; determine, through analysis, whether the real-time data is normal or abnormal; and when determining that the real-time data is abnormal, send a solving policy to the mobile device terminal; or if a solving policy corresponding to the abnormal real-time data cannot be found, report the abnormal real-time data to the monitoring host, and after receiving a solving policy fed back by the monitoring host, send, to the mobile device terminal corresponding to the abnormal real-time data, the solving policy fed back by the monitoring host.

10 Claims, 3 Drawing Sheets

ABNORMALITY MONITORING METHOD AND SYSTEM BASED ON ROAMING SYSTEM

CROSS-REFERENCE TO RELATED APPLICATIONS

The present application claims the benefit of Chinese Patent Application No. 202011242571.8 filed on Nov. 9, 2020, the contents of which are hereby incorporated by reference.

TECHNICAL FIELD

The present disclosure relates to the field of communications technologies, and in particular, to an abnormality monitoring method and system based on a roaming system.

BACKGROUND

Digital Enhanced Cordless Telecommunications (DECT) is a digital communication standard, and is mainly used to develop cordless telephone systems. The DECT protocol is a standard formulated by the European Telecommunications Standards Institute. It is mainly used for home or small office systems, but is also applied in private branch exchange (PBX) systems of many large and medium-sized enterprises.

In a conventional abnormality monitoring technology scheme, one monitoring host monitors multiple handset devices. This easily leads to problems such as data loss caused due to an excessively long transmission distance and a handset device failure caused because the monitoring host is abnormal. Several handset devices are connected to one monitoring host. A handset device sends data to the monitoring host or receives data from the monitoring host according to the protocol. After the data is received, an interface of the handset device displays related information. However, once multiple handset devices report data at the same time, the monitoring host cannot conduct processing in time because there is an excessively large amount of event information, or some handset devices cannot receive related information responses due to a loss of received data.

SUMMARY

In view of the foregoing technical problems, the present disclosure provides an abnormality monitoring method and system based on a roaming system, to assign a processing task of a monitoring host to a roaming system for processing, to prevent all information from being centralized in the monitoring host, thereby improving abnormality monitoring processing efficiency. The technical solutions are as follows.

According to a first aspect, an embodiment of the present disclosure provides an abnormality monitoring system based on a roaming system, including a monitoring host, a mobile device terminal, and a roaming device group, where the roaming device group includes a cluster service host and several roaming hosts;

any one of the roaming hosts directly communicates with the mobile device terminal, and indirectly communicates with the monitoring host by the cluster service host; and any one of the roaming hosts is configured to:

receive real-time data uploaded by the mobile device terminal;

determine, through analysis, whether the real-time data is normal or abnormal; and when determining that the real-time data is abnormal, send a solving policy to the mobile device terminal, where the solving policy is information including a suggestion for solving a data abnormality problem; or if a solving policy corresponding to the abnormal real-time data cannot be found, report the abnormal real-time data to the monitoring host, and after receiving a solving policy fed back by the monitoring host, send, to the mobile device terminal corresponding to the abnormal real-time data, the solving policy fed back by the monitoring host.

In a first possible implementation of the first aspect of the present disclosure, the mobile device terminal is configured to:

search for a roaming host, and connect to the found roaming host;

collect real-time data, and upload the real-time data to the connected roaming host; and when detecting that a signal for communication between the mobile device terminal and the connected roaming host is unstable, get disconnected from the connected roaming host, and search for a roaming host with a strongest signal again for connection.

In a second possible implementation of the first aspect of the present disclosure, the monitoring host delivers a newest solving policy to the cluster service host; and the cluster service host synchronously sends the newest solving policy to all connected roaming hosts.

In a third possible implementation of the first aspect of the present disclosure, the mobile device terminal accesses, according to the DECT protocol, a roaming host connected to the mobile device terminal, and learns a real-time status of the mobile device terminal from the roaming host.

In a fourth possible implementation of the first aspect of the present disclosure, when the mobile device terminal accesses, according to the DECT protocol, a roaming host connected to the mobile device terminal, the mobile device terminal is further configured to:

after sending a request to the roaming host, if receiving an acceptance notification from the roaming host, create an interface to display an access status; or if receiving a rejection notification from the roaming host, send a prompt that access to a current function is not allowed.

In a fifth possible implementation of the first aspect of the present disclosure, the monitoring host is further configured to conduct function setting on the cluster service host;

the cluster service host is further configured to conduct function setting on the several roaming hosts; and each roaming host conducts function setting on a mobile device terminal correspondingly connected to the roaming host.

According to a second aspect, an embodiment of the present disclosure provides an abnormality monitoring method based on a roaming system, including:

receiving real-time data uploaded by a mobile device terminal;

determining, through analysis, whether the real-time data is normal or abnormal; and when it is determined that the real-time data is abnormal, sending a solving policy to the mobile device terminal, where the solving policy is information including a suggestion for solving a data abnormality problem; or if a solving policy corresponding to the abnormal real-time data cannot be found, reporting the abnormal real-time data to a monitoring host, and after a solving policy fed back by the monitoring host is received, sending, to the mobile device terminal corresponding to the abnormal real-time data, the solving policy fed back by the monitoring host.

In a first possible implementation of the second aspect of the present disclosure, when the abnormality monitoring method based on a roaming system is conducted, and when a roaming host detects that a signal for communication between the roaming host and the mobile device terminal is unstable, the roaming host gets disconnected from the mobile device terminal; and the mobile device terminal searches for a roaming host with a strongest signal again for connection.

In a second possible implementation of the second aspect of the present disclosure, after the receiving real-time data uploaded by a mobile device terminal, the method further includes:

communicating with the mobile device terminal according to the DECT protocol, and sending a real-time status corresponding to the mobile device terminal to the mobile device terminal in response to an access request from the mobile device terminal.

In a third possible implementation of the second aspect of the present disclosure, the communicating with the mobile device terminal according to the DECT protocol further includes:

after sending the access request, if receiving an acceptance notification, creating, by the mobile device terminal, an interface to display an access status; or if receiving a rejection notification, sending a prompt that access to a current function is not allowed.

Compared with the prior art, embodiments of the present disclosure have the following beneficial effects.

The present disclosure provides an abnormality monitoring method and system based on a roaming system. In the solutions of the present disclosure, a roaming system includes several roaming hosts and a cluster service host of a roaming device group. A mobile device terminal searches for a roaming host, is connected to the found roaming host, collects real-time data, and uploads the real-time data to the connected roaming host. The roaming host first determines, through analysis, whether the real-time data is normal or abnormal, and sends a found solving policy to the mobile device terminal when determining that the real-time data is abnormal. In this way, the abnormal real-time data does not need to be uploaded to a monitoring host, and the solving policy for problem solving can be sent to the mobile device terminal, so as to disperse processing tasks. If a solving policy corresponding to the abnormal real-time data cannot be found, the roaming host reports the abnormal real-time data to the monitoring host, and then sends, to the mobile device terminal corresponding to the abnormal real-time data, a solving policy fed back by the monitoring host. This prevents all information from being centralized in the monitoring host, thereby improving abnormality monitoring processing efficiency.

DETAILED DESCRIPTION

The following clearly and completely describes the technical solutions in the embodiments of the present disclosure with reference to accompanying drawings in the embodiments of the present disclosure. Apparently, the described embodiments are merely a part rather than all of the examples of the present disclosure. All other embodiments obtained by persons of ordinary skill in the art based on the embodiments in the present disclosure without creative efforts shall fall within the protection scope of the present disclosure.

Figure 1:
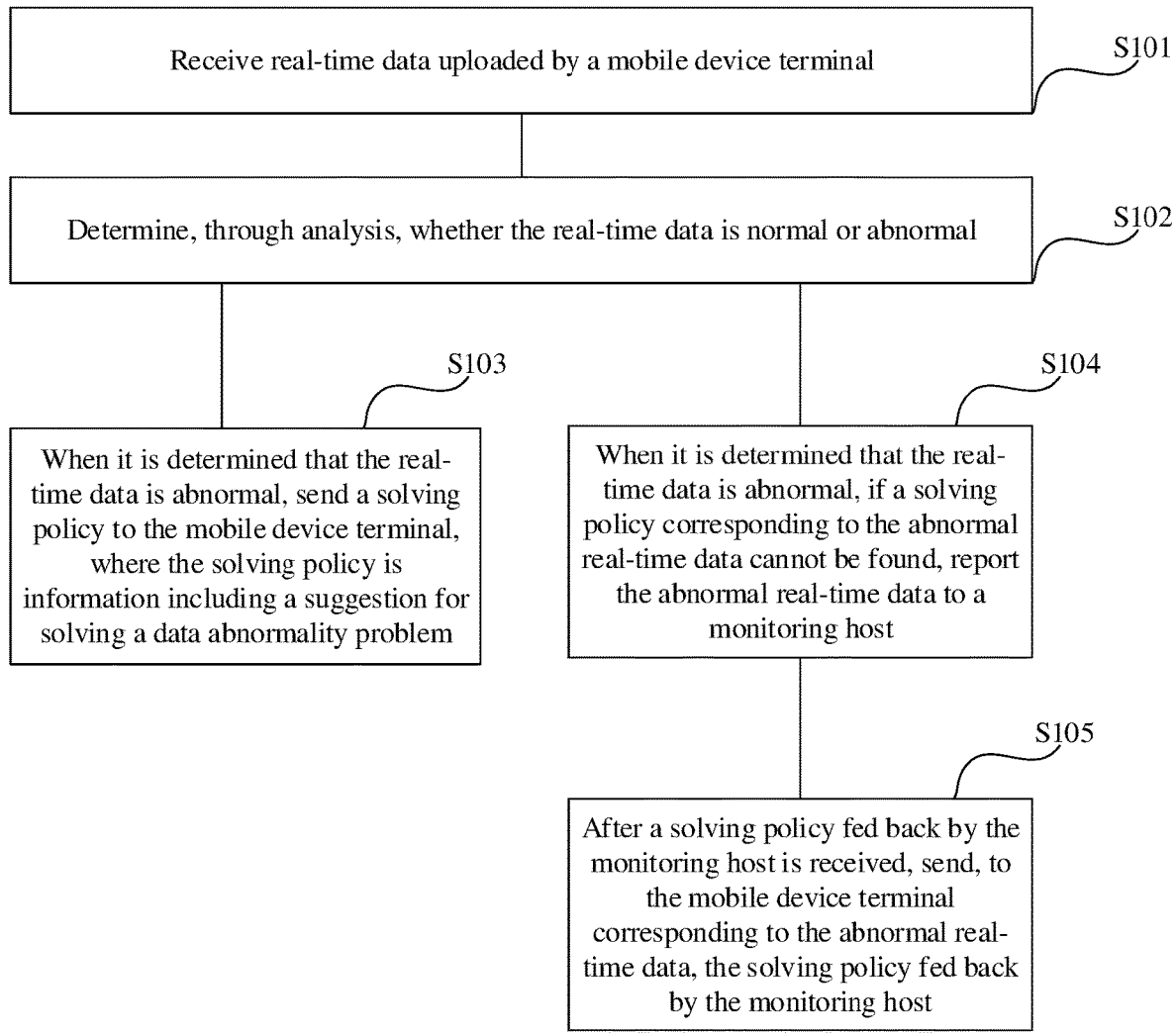
FIG. 1 is a flowchart of steps of an abnormality monitoring method based on a roaming system according to an embodiment of the present disclosure.
Figure 2:
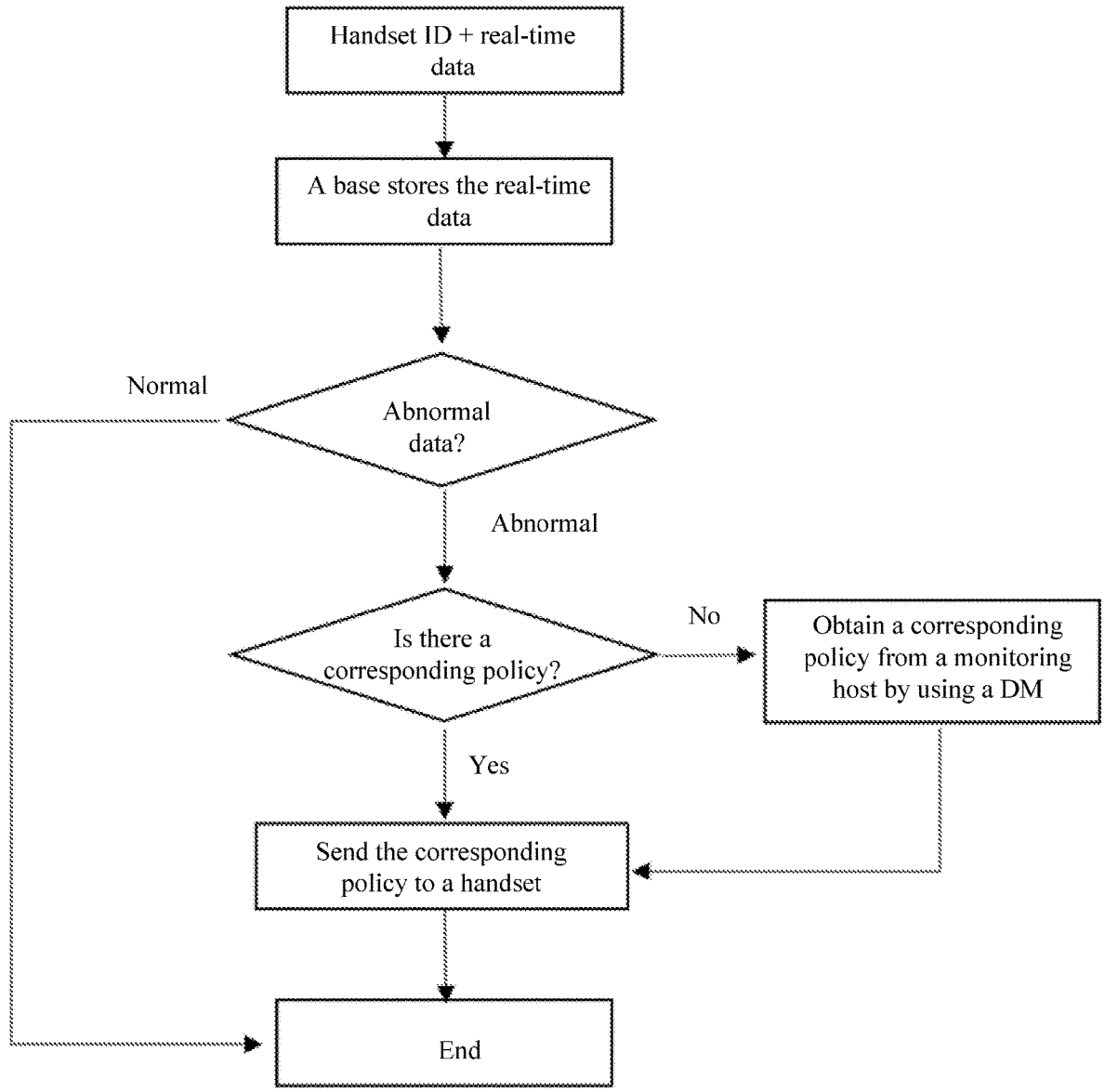
FIG. 2 is a working flowchart of requesting a solving policy in an abnormality monitoring method based on a roaming system according to an embodiment of the present disclosure.

Referring to FIG. 1 and FIG. 2, an embodiment of this solution provides an abnormality monitoring method based on a roaming system, including the following steps.

S101. Receive real-time data uploaded by a mobile device terminal.

S102. Determine, through analysis, whether the real-time data is normal or abnormal.

S103. When it is determined that the real-time data is abnormal, send a solving policy to the mobile device terminal, where the solving policy is information including a suggestion for solving a data abnormality problem.

S104. If a solving policy corresponding to the abnormal real-time data cannot be found, report the abnormal real-time data to a monitoring host.

S105. After a solving policy fed back by the monitoring host is received, send, to the mobile device terminal corresponding to the abnormal real-time data, the solving policy fed back by the monitoring host.

The mobile device terminal includes but is not limited to a handset and a headset.

The solving policy, that is, information about a suggestion corresponding to a variety of abnormal data (abnormal events), is stored in the monitoring host and a roaming host. When abnormal data (an abnormal event) is received, a solving policy is obtained through automatic matching. To be specific, the monitoring host and the roaming host are searched for information about a suggestion for problem solving.

For example, an abnormal event is that temperature is excessively high. When the temperature is excessively high, a policy is determined according to a specific high-temperature level, for example, the temperature is really excessively high, and it is not suitable to go out, or although the temperature is high, a person can still take an umbrella when going out.

It should be noted that the monitoring host configures a corresponding solving policy for an abnormal event, and delivers a newest abnormal event processing policy to a DM; the DM reads the newest abnormal event processing policy; and a base connected to the DM reads the newest abnormal event processing policy. Therefore, solving policies in the monitoring host and the roaming host base are generally the same. An abnormal event needs to be reported to the monitoring host only after a new solving policy is added to the monitoring host but is not updated to the roaming host base in time. Therefore, a handset first interacts with the roaming host to solve an abnormal event, instead of reporting all abnormal events to the monitoring host. In other words, burden of the monitoring host is reduced by the roaming host. In this way, a quantity of times the monitoring host processes an event can be reduced, thereby preventing shutdown.

It can be understood that a cluster service host sorts out real-time data that is sent by multiple roaming hosts and that is to be uploaded to the monitoring host, and then uploads the real-time data to the monitoring host, so as to reduce a quantity of times multiple roaming hosts access the monitoring host.

In this embodiment, a preferred manner is further provided. When a roaming host detects that a signal for communication between the roaming host and the mobile device terminal is unstable, the roaming host gets disconnected from the mobile device terminal; and the mobile device terminal searches for a roaming host with a strongest signal again for connection.

It can be understood that the searching for a roaming host may be automatically selecting a roaming host with a best signal or manually selecting the found roaming host.

Once a roaming host is abnormal, that is, when detecting that a signal for communication between the mobile device terminal and the connected roaming host is unstable, the mobile device terminal gets disconnected from the connected roaming host, and searches for a roaming host with a strongest signal again for connection, so as to switch to a nearby roaming host for communication. This avoids data loss and a roaming system failure, to ensure that related information is displayed on an interface of the mobile device terminal when data is successfully received, thereby ensuring normal operation of data abnormality monitoring.

In this embodiment, a preferred implementation is further provided. After the receiving real-time data uploaded by a mobile device terminal, the method further includes:
communicating with the mobile device terminal according to the DECT protocol, and sending a real-time status corresponding to the mobile device terminal to the mobile device terminal in response to an access request from the mobile device terminal.

It can be understood that the real-time status may be a normal state or an abnormal state. The roaming host determines, based on real-time data uploaded by a current mobile device terminal, whether the real-time data is normal or abnormal, and correspondingly notifies that the current mobile device terminal is in the normal state or the abnormal state.

Specifically, the communicating with the mobile device terminal according to the DECT protocol further includes:
after sending the access request, if receiving an acceptance notification, creating, by the mobile device terminal, an interface to display an access status; or
if receiving a rejection notification, sending a prompt that access to a current function is not allowed.

In this embodiment, a preferred implementation is further provided. The step of searching for a roaming host, and connecting to the found roaming host specifically includes:
uploading, based on found radio fixed part identity information, identification information of the mobile device terminal to a roaming host corresponding to the radio fixed part identity information, where the roaming host sends both the identification information of the mobile device terminal and identification information of the roaming host to the cluster service host, to complete registration of a connection between the mobile device terminal and the roaming host.

It can be understood that after the mobile device terminal is moved, when a signal of a roaming host currently connected to the mobile device terminal is unstable, the mobile device terminal gets disconnected from the current roaming host, and then automatically switches to connect to a nearby roaming host with a best signal, to complete registration of a connection between the mobile device terminal and the roaming host.

In this embodiment, a preferred implementation is further provided. The monitoring host delivers a newest solving policy to the cluster service host; and the cluster service host synchronously sends the newest solving policy to all connected roaming hosts.

It can be understood that, solving policies in the monitoring host and the roaming host base are generally the same. An abnormal event needs to be reported to the monitoring host only after a new solving policy is added to the monitoring host but is not updated to the roaming host base in time. Due to the use of the roaming host, a case that a handset fails due to an abnormal case such as shutdown of the monitoring host no longer occurs. The handset can report data normally to obtain a policy for solving an abnormal event, provided that one roaming host can still be found.

In this embodiment, a preferred implementation is further provided. In the abnormality monitoring method based on a roaming system,
the monitoring host is further configured to conduct function setting on the cluster service host;
the cluster service host is further configured to conduct function setting on the several roaming hosts; and
each roaming host conducts function setting on a mobile device terminal correspondingly connected to the roaming host.

The function setting means: The monitoring host, the cluster service host, the roaming hosts, and the mobile device terminal may be located in different areas; and to distinguish between the different areas, function setting is conducted to determine which functions can be implemented and which functions are not to be implemented.

In a specific example, if there is too much noise in a place all year round, an abnormal event about noise should not be processed in this place. Therefore, noise event processing in this area should be disabled according to a configuration, but noise processing in other areas still needs to be conducted. A configuration of a DM is determined by the monitoring host, a configuration of a base is determined by the DM, and a configuration of a handset is determined by the base.

Specifically, the monitoring host is started, obtains and records an information status of the DM in a working state, and delivers a newest abnormal event processing policy and function configuration information of the DM.

The DM is started, obtains and records an information status of the base in a working state, reports the information status to the monitoring host, and reads the newest abnormal event processing policy and the function configuration information of the DM; and the monitoring host records the information status of the DM.

The base is started, reports related information status of the base to the DM, and reads the newest abnormal event processing policy and function configuration information of the base; and the DM records the information status of the base.

In another specific implementation, the base reports an unmatched abnormal event to the monitoring host, the monitoring host delivers a corresponding solving policy to the base, and the base stores the solving policy to implement solving policy synchronization between the monitoring host and the base.

Figure 3:
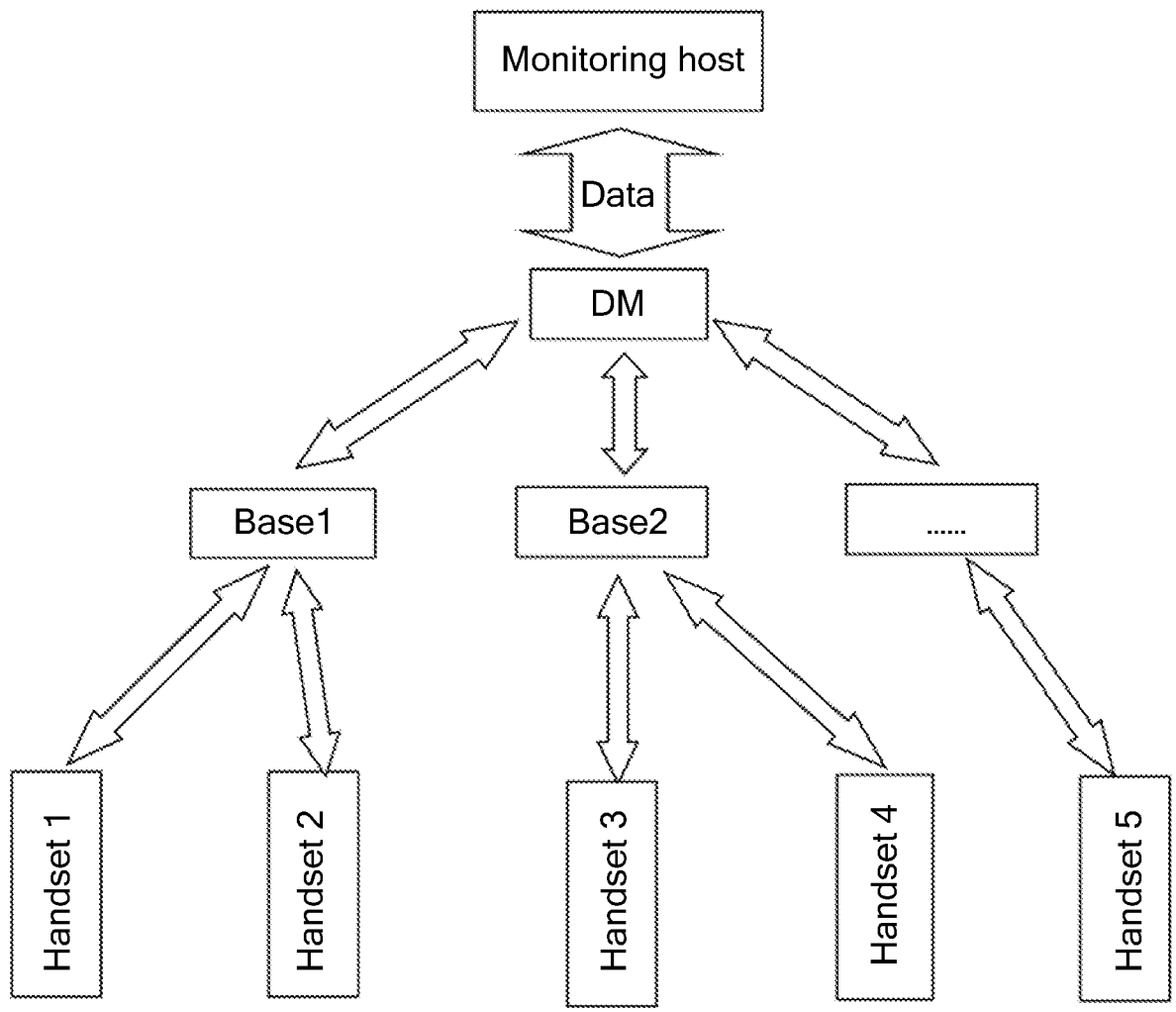
FIG. 3 is a schematic communication diagram of an abnormality monitoring system based on a roaming system according to an embodiment of the present disclosure.

Referring to FIG. 3, an embodiment of this solution provides an abnormality monitoring system based on a roaming system, including a monitoring host, a mobile device terminal, and a roaming device group, where the roaming device group includes a cluster service host and several roaming hosts.

Any one of the roaming hosts directly communicates with the mobile device terminal, and indirectly communicates with the monitoring host by the cluster service host.

Any one of the roaming hosts is configured to:
receive real-time data uploaded by the mobile device terminal;
determine, through analysis, whether the real-time data is normal or abnormal; and
when determining that the real-time data is abnormal, send a solving policy to the mobile device terminal, where the solving policy is information including a suggestion for solving a data abnormality problem; or
if a solving policy corresponding to the abnormal real-time data cannot be found, report the abnormal real-time data to the monitoring host, and
after receiving a solving policy fed back by the monitoring host, send, to the mobile device terminal corresponding to the abnormal real-time data, the solving policy fed back by the monitoring host.

The mobile device terminal includes but is not limited to a handset and a headset.

The solving policy, that is, information about a suggestion corresponding to a variety of abnormal data (abnormal events), is stored in the monitoring host and a roaming host. When abnormal data (an abnormal event) is received, a solving policy is obtained through automatic matching. To be specific, the monitoring host and the roaming host are searched for information about a suggestion for problem solving.

It should be noted that the monitoring host configures a corresponding solving policy for an abnormal event, and delivers a newest abnormal event processing policy to a DM; the DM reads the newest abnormal event processing policy; and a base connected to the DM reads the newest abnormal event processing policy. Therefore, solving policies in the monitoring host and the roaming host base are generally the same. An abnormal event needs to be reported to the monitoring host only after a new solving policy is added to the monitoring host but is not updated to the roaming host base in time. Therefore, a handset first interacts with the roaming host to solve an abnormal event, instead of reporting all abnormal events to the monitoring host. In other words, burden of the monitoring host is reduced by the roaming host. In this way, a quantity of times the monitoring host processes an event can be reduced, thereby preventing shutdown.

It can be understood that the cluster service host sorts out real-time data that is sent by multiple roaming hosts and that is to be uploaded to the monitoring host, and then uploads the real-time data to the monitoring host, so as to reduce a quantity of times multiple roaming hosts access the monitoring host.

In this embodiment, a preferred implementation is further provided. The mobile device terminal is configured to:
search for a roaming host, and connect to the found roaming host;
collect real-time data, and upload the real-time data to the connected roaming host; and
when detecting that a signal for communication between the mobile device terminal and the connected roaming host is unstable, get disconnected from the connected roaming host, and search for a roaming host with a strongest signal again for connection.

It can be understood that the searching for a roaming host may be automatically selecting a roaming host with a best signal or manually selecting the found roaming host.

Once a roaming host is abnormal, that is, when detecting that a signal for communication between the mobile device terminal and the connected roaming host is unstable, the mobile device terminal gets disconnected from the connected roaming host, and searches for a roaming host with a strongest signal again for connection, so as to switch to a nearby roaming host for communication. This avoids data loss and a roaming system failure, to ensure that related information is displayed on an interface of the mobile device terminal when data is successfully received, thereby ensuring normal operation of data abnormality monitoring.

In this embodiment, a preferred implementation is further provided; and the mobile device terminal accesses, according to the DECT protocol, a roaming host connected to the mobile device terminal, and learns a real-time status of the mobile device terminal from the roaming host.

It can be understood that the real-time status may be a normal state or an abnormal state. The roaming host determines, based on real-time data uploaded by a current mobile device terminal, whether the real-time data is normal or abnormal, and correspondingly notifies that the current mobile device terminal is in the normal state or the abnormal state.

Specifically, when the mobile device terminal accesses, according to the DECT protocol, a roaming host connected to the mobile device terminal, the mobile device terminal is further configured to:
after sending a request to the roaming host, if receiving an acceptance notification from the roaming host, create an interface to display an access status; or
if receiving a rejection notification from the roaming host, send a prompt that access to a current function is not allowed.

In this embodiment, a preferred implementation is further provided. The step of searching for a roaming host, and connecting to the found roaming host specifically includes:
uploading, based on found radio fixed part identity information, identification information of the mobile device terminal to a roaming host corresponding to the radio fixed part identity information, where the roaming host sends both the identification information of the mobile device terminal and identification information of the roaming host to the cluster service host, to complete registration of a connection between the mobile device terminal and the roaming host.

It can be understood that after the mobile device terminal is moved, when a signal of a roaming host currently connected to the mobile device terminal is unstable, the mobile device terminal gets disconnected from the current roaming host, and then automatically switches to connect to a nearby roaming host with a best signal, to complete registration of a connection between the mobile device terminal and the roaming host.

In this embodiment, a preferred implementation is further provided. The monitoring host delivers a newest solving policy to the cluster service host; and the cluster service host synchronously sends the newest solving policy to all connected roaming hosts.

It can be understood that, solving policies in the monitoring host and the roaming host base are generally the same. An abnormal event needs to be reported to the monitoring host only after a new solving policy is added to the monitoring host but is not updated to the roaming host base in time. Due to the use of the roaming host, a case that the handset fails due to an abnormal case such as shutdown of the monitoring host no longer occurs. The handset can report data normally to obtain a policy for solving an abnormal event, provided that one roaming host can still be found.

In this embodiment, a preferred implementation is further provided. The monitoring host is further configured to conduct function setting on the cluster service host;
the cluster service host is further configured to conduct function setting on the several roaming hosts; and
each roaming host conducts function setting on a mobile device terminal correspondingly connected to the roaming host.

The function setting means: The monitoring host, the cluster service host, the roaming hosts, and the mobile device terminal may be located in different areas; and to distinguish between the different areas, function setting is conducted to determine which functions can be implemented and which functions are not to be implemented.

Specifically, the monitoring host is started, obtains and records an information status of the DM in a working state, and delivers a newest abnormal event processing policy and function configuration information of the DM.

The DM is started, obtains and records an information status of the base in a working state, reports the information status to the monitoring host, and reads the newest abnormal event processing policy and the function configuration information of the DM; and the monitoring host records the information status of the DM.

The base is started, reports related information status of the base to the DM, and reads the newest abnormal event processing policy and function configuration information of the base; and the DM records the information status of the base.

In another specific implementation, the base reports an unmatched abnormal event to the monitoring host, the monitoring host delivers a corresponding solving policy to the base, and the base stores the solving policy to implement solving policy synchronization between the monitoring host and the base.

It should be noted that in the technical solutions of the present disclosure, the foregoing abnormal event includes but is not limited to: there is too much noise around a working area of a handset, temperature is excessively high or excessively low, and a handset owner falls. These cases are all abnormal events.

The foregoing terms are described as follows.

DECT refers to digital enhanced cordless telecommunications.

The base refers to a DECT device fixed-end, a roaming host, a base station of a mobile phone, or the like.

The handset refers to a mobile device terminal, a wireless device connected to a base, a mobile phone, or the like, and is also referred to as HS for short.

The roaming system refers to a DECT cluster, or a DECT system in which a handset can roam between multiple bases.

The DM refers to a host that provides a cluster service for all bases in a local area network.

The RFPI refers to a radio fixed part identity such as a MAC address. The RFPI is sent by a base station, can be identified by all portable DECT terminals, and provides information about a private automatic branch exchange (PABX) (Performance Application Programming Interface, PAPI) identity, access permission, and a base station (RPN).

The monitoring host refers to a monitoring device and a roaming host, and may be a device that can store information about a mobile device terminal and a roaming host.

The present disclosure provides an abnormality monitoring method and system based on a roaming system. In the solutions of the present disclosure, a roaming system includes several roaming hosts and a cluster service host of a roaming device group. A mobile device terminal searches for a roaming host, is connected to the found roaming host, collects real-time data, and uploads the real-time data to the connected roaming host. The roaming host first determines, through analysis, whether the real-time data is normal or abnormal, and sends a found solving policy to the mobile device terminal when determining that the real-time data is abnormal. In this way, the abnormal real-time data does not need to be uploaded to a monitoring host, and the solving policy for problem solving can be sent to the mobile device terminal, so as to disperse processing tasks. If a solving policy corresponding to the abnormal real-time data cannot be found, the roaming host reports the abnormal real-time data to the monitoring host, and then sends, to the mobile device terminal corresponding to the abnormal real-time data, a solving policy fed back by the monitoring host. This prevents all information from being centralized in the monitoring host, thereby improving abnormality monitoring processing efficiency.

Once a roaming host is abnormal, that is, when detecting that a signal for communication between the mobile device terminal and the connected roaming host is unstable, the mobile device terminal gets disconnected from the connected roaming host, and searches for a roaming host with a strongest signal again for connection, so as to switch to a nearby roaming host for communication. This avoids data loss and a roaming system failure, to ensure that related information is displayed on an interface of the mobile device terminal when data is successfully received, thereby ensuring normal operation of data abnormality monitoring.

The descriptions above are preferred embodiments of the present disclosure, and it should be noted that for persons of ordinary skill in the art, several improvements and modifications can be made without departing from the principles of the present disclosure. These improvements and modifications should also be regarded as falling into the protection scope of the present disclosure.

Persons of ordinary skill in the art can understand that all or some of processes for implementing the methods of the foregoing embodiments can be completed by instructing relevant hardware through a computer program. The program may be stored in a computer readable storage medium. When the program is executed, processes of the embodiments of the foregoing methods may be included. The storage medium may be a magnetic disk, an optical disc, a read-only memory (ROM), a random access memory (RAM), or the like.

The invention claimed is:

1. An abnormality monitoring system based on a roaming system, comprising a monitoring host, a mobile device terminal, and a roaming device group, wherein the roaming device group comprises a cluster service host and several roaming hosts;
any one of the roaming hosts directly communicates with the mobile device terminal, and indirectly communicates with the monitoring host by the cluster service host; and
any one of the roaming hosts is configured to:
receive real-time data uploaded by the mobile device terminal;
determine, through analysis, whether the real-time data is normal or abnormal; and when determining that the real-time data is abnormal, send a solving policy to the mobile device terminal, wherein the solving policy is information comprising a suggestion for solving a data abnormality problem; or if a solving policy corresponding to the abnormal real-time data cannot be found, report the abnormal real-time data to the monitoring host, and after receiving a solving policy fed back by the monitoring host, send, to the mobile device terminal corresponding to the abnormal real-time data, the solving policy fed back by the monitoring host.

2. The abnormality monitoring system based on a roaming system according to claim 1, wherein the mobile device terminal is configured to:

search for a roaming host, and connect to the found roaming host;

collect real-time data, and upload the real-time data to the connected roaming host; and when detecting that a signal for communication between the mobile device terminal and the connected roaming host is unstable, get disconnected from the connected roaming host, and search for a roaming host with a strongest signal again for connection.

3. The abnormality monitoring system based on a roaming system according to claim 1, wherein the monitoring host delivers a newest solving policy to the cluster service host; and the cluster service host synchronously sends the newest solving policy to all connected roaming hosts.

4. The abnormality monitoring system based on a roaming system according to claim 1, wherein the mobile device terminal accesses, according to the Digital Enhanced Cordless Telecommunications (DECT) protocol, a roaming host connected to the mobile device terminal, and learns a real-time status of the mobile device terminal from the roaming host.

5. The abnormality monitoring system based on a roaming system according to claim 4, wherein when the mobile device terminal accesses, according to the DECT protocol, a roaming host connected to the mobile device terminal, the mobile device terminal is further configured to:

after sending a request to the roaming host, if receiving an acceptance notification from the roaming host, create an interface to display an access status; or if receiving a rejection notification from the roaming host, send a prompt that access to a current function is not allowed.

6. The abnormality monitoring system based on a roaming system according to claim 5, wherein the monitoring host is further configured to conduct function setting on the cluster service host;

the cluster service host is further configured to conduct function setting on the several roaming hosts; and each roaming host conducts function setting on a mobile device terminal correspondingly connected to the roaming host.

7. An abnormality monitoring method based on a roaming system, comprising:

receiving real-time data uploaded by a mobile device terminal;

determining, through analysis, whether the real-time data is normal or abnormal; and when it is determined that the real-time data is abnormal, sending a solving policy to the mobile device terminal, wherein the solving policy is information comprising a suggestion for solving a data abnormality problem; or if a solving policy corresponding to the abnormal real-time data cannot be found, reporting the abnormal real-time data to a monitoring host, and after a solving policy fed back by the monitoring host is received, sending, to the mobile device terminal corresponding to the abnormal real-time data, the solving policy fed back by the monitoring host.

8. The abnormality monitoring method based on a roaming system according to claim 7, wherein when a roaming host detects that a signal for communication between the roaming host and the mobile device terminal is unstable, the roaming host gets disconnected from the mobile device terminal; and the mobile device terminal searches for a roaming host with a strongest signal again for connection.

9. The abnormality monitoring method based on a roaming system according to claim 7, after receiving real-time data uploaded by a mobile device terminal, further comprising:

communicating with the mobile device terminal according to the Digital Enhanced Cordless Telecommunications (DECT) protocol, and sending a real-time status corresponding to the mobile device terminal to the mobile device terminal in response to an access request from the mobile device terminal.

10. The abnormality monitoring method based on a roaming system according to claim 9, wherein the communicating with the mobile device terminal according to the DECT protocol further comprises:

after sending the access request, if receiving an acceptance notification, creating, by the mobile device terminal, an interface to display an access status; or if receiving a rejection notification, sending a prompt that access to a current function is not allowed.

* * * * *